(12) United States Patent
Zucker

(10) Patent No.: US 6,428,881 B1
(45) Date of Patent: Aug. 6, 2002

(54) MATBOARD/BACKING BOARD AND METHODS OF MANUFACTURE AND USE

(75) Inventor: David Zucker, Philadelphia, PA (US)

(73) Assignee: Rupaco Paper Corporation, Edison, NJ (US)

( * ) Notice: Subject to any disclaimer, the term of this patent is extended or adjusted under 35 U.S.C. 154(b) by 0 days.

(21) Appl. No.: 09/399,193

(22) Filed: Sep. 17, 1999

(51) Int. Cl.[7] .................. B32B 21/06; B32B 21/08; B32B 27/036

(52) U.S. Cl. .............. 428/212; 428/36.6; 428/480; 428/481; 428/534; 428/535; 428/537.5; 40/768

(58) Field of Search .............. 428/36.6, 77, 78, 428/79, 480, 481, 507, 511, 512, 513, 534, 535, 537.5, 542.6, 212; 422/291, 90; 40/768

(56) References Cited

U.S. PATENT DOCUMENTS

| | | | |
|---|---|---|---|
| 3,898,356 A | 8/1975 | Williams et al. | |
| 4,207,366 A | * 6/1980 | Tyler | 428/73 |
| 4,489,120 A | 12/1984 | Hollinger, Jr. | |
| 5,525,296 A | 6/1996 | Hollinger, Jr. | |
| 5,633,054 A | 5/1997 | Hollinger, Jr. | |
| 5,676,909 A | 10/1997 | Hollinger, Jr. | |
| 5,683,662 A | * 11/1997 | Hollinger, Jr. | 422/291 |
| 5,693,384 A | 12/1997 | Hollinger, Jr. | |
| 5,714,120 A | 2/1998 | Hollinger, Jr. | |
| 5,919,575 A | * 7/1999 | Bowns, IV et al. | 428/537.5 |
| 5,922,280 A | 7/1999 | Hollinger, Jr. | |

OTHER PUBLICATIONS

"Films and Sheeting Materials," Kirk–Othmer Encyclopedia of Chemical Technology, 3rd Ed., vol. 10, (1980), pp. 222–223, 229.*

* cited by examiner

Primary Examiner—Vivian Chen
(74) Attorney, Agent, or Firm—Frommer Lawrence & Haug LLP

(57) ABSTRACT

Described and claimed are mat boards and backing boards buffered to a pH greater than 7.0 and having as an outer layer a vapor barrier and protective material such as PET, PBT, co-PBT co-PET and mixtures thereof, as well as methods for making and using such matboards and backing boards.

34 Claims, 1 Drawing Sheet

US 6,428,881 B1

MATBOARD/BACKING BOARD AND METHODS OF MANUFACTURE AND USE

FIELD OF THE INVENTION

The present invention relates to a matboard and/or backing board and to methods of making and using it. Matboard and/or backing board is used as a barrier for protecting artwork on paper or in acrhival packaging or in picture or artwork framing.

The invention further generally relates to matboard and/or backing board comprised of an outer layer that is a protective layer and a vapor barrier; e.g., preferably PET, PBT, co-PET, co-PBT or mixtures thereof; and methods for making and using the same.

The invention also relates in a first advantageous embodiment to a matboard comprising: a first layer of mat paper (of any various color), advantageously buffered to the basic side of neutral pH, e.g., greater than pH 7, such as pH of greater than 7.0 to about 9.0 or about 7.5 to about 8.0; a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; a third layer of board core, e.g., chipboard core or solid white core or cotton fiber board, advantageously alum and/or lignin free, preferably alum and lignin free, and also advantageously alkaline, such as pH of greater than 7.0 , e.g., pH of about 7.1 to about 10.0 such as a pH of about 7.2 to about 9.5; a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; and a fifth layer, which is an outer layer, of a vapor barrier and protective material, such as PET, PBT, co-PET, co-PBT and mixtures thereof. Advantageously, the first, second, third, fourth and fifth layers are in direct contact (first to second, second to first and third, third to second and fourth, fourth to third and fifth and fifth to fourth).

The invention also relates in a second advantageous embodiment to a backing board comprising: a first layer, which is an outer layer, of a vapor barrier and protective material, such as PET, PBT, co-PET, co-PBT and mixtures thereof; a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; and a fifth layer, which is an outer layer, of a vapor barrier and protective material, such as PET, PBT, co-PET, co-PBT and mixtures thereof. Advantageously, the first, second, third, fourth and fifth layers are in direct contact (first to second, second to first and third, third to second and fourth, fourth to third and fifth and fifth to fourth).

The inventive matboard and/or backing board can be any suitable size or shape, e.g., round, square, rectangle, etc. The sizes and shapes for an inventive matboard and/or backing board can be matched to artwork or archival document and the like for which it is to be used as backing. The protective and vapor barrier layer (e.g., PET, PBT, co-PET, co-PBT and mixtures thereof) is advantageously non-reactive, and acid free, and more advantageously neutral, non-reactive and a protective barrier against the migration of trace amounts of acid, moisture and other contaminants that might potentially damage artwork, archival documents and the like.

More generally, the protective and vapor barrier layer is advantageously a thermoplastic such as a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, or a polyethylene such as a polyethylene from a single site catalyst system, or a metal foil. In preferred embodiments, this layer is from PET, PBT, cope, coPBT or mixtures thereof, most preferably, PET; and, this layer can be metallized, e.g., in gold, silver or another color.

The first, third and fifth layers of the aforementioned first and second advantageous embodiments are joined in any desired manner, preferably via lamination with the second and fourth adhesive layers (e.g., polyvinyl acetate or "PVA" layers) as described above together. Thus, in a further embodiment, the invention relates to a matboard or a backing board comprising the first, third and fifth layers of the aforementioned first and second advantageous embodiments.

The invention therefore contemplates a method of manufacture comprising laminating the first, third and fifth layers via the second and fourth adhesive layers.

And, the invention contemplates methods of using the matboard and/or backing board, e.g., providing a matboard and/or backing board of the invention and placing artwork or an archival document or picture upon it, and optionally framing the artwork, document or picture in a frame (with or without glass or plastic over the artwork, document or picture) with the artwork, document or picture against the matboard and/or backing board.

Other aspects of the invention are described herein or are obvious from this text. In this text, "comprising" is used in the sense attributed to it in U.S. Patent Law; e.g., it can mean "including". Various documents are cited in this text ("herein cited documents"). Herein cited documents and documents cited or referenced in herein cited documents, are hereby incorporated herein by reference.

BACKGROUND OF THE INVENTION

A standard matboard can be composed of mat facing paper buffered to the basic side of neutral pH, a PVA layer buffered to a pH of 7.5–8.0, regular unbleached pulp core (acid free by not totally lignin free), another PVA layer, and a backing of alkaline book paper (acid free, but porous and not a barrier to the passage of contaminants).

White core matboard can be composed of mat facing paper buffered to the basic side of neutral pH, a PVA layer buffered to a pH of 7.5–8.0, a solid white core (alum and lignin free and alikaline with a pH of 7.2 to 9.5), another PVA layer, and a backing of alkaline book paper (acid free, but porous and not a barrier to the passage of contaminants).

Museum board can be composed of one to several layers of 100% cotton fiber board laminated with all natural starch adhesive, acid free and buffered with 3% calcium carbonate to a Ph of 8.5 to 9.5 and alum free and alkaline with no lignin. This board can be porous and not a barrier to the passage of contaminants.

Reference is also made to Williams et al., U.S. Pat. No. 3,898,356, and Hollinger, Jr., U.S. Pat. Nos. 4,489,120, 5,525,296, 5,633,054, 5,693,384, 5,714,120, and 5,922,280. These documents fail to teach or suggest a matboard and/or backing board as herein described.

Thus, it is a problem in the art that matboards and backing boards can be porous; fail to include an outer layer of a protective and vapor barrier film such as PET, PBT, co-PET, co-PBT and mixtures thereof, or as described herein. For better preservation of artwork and documents and pictures, it would be desirable to provide matboards and backing boards can be porous; fail to include an outer layer of a protective and vapor barrier film such as PET, PBT, co-PET, co-PBT and mixtures thereof, or as described herein. It is also believed that heretofore the art has not provided, taught or suggested a matboard and/or backing board or methods for making or using the same as in the present invention.

OBJECTS AND SUMMARY OF THE INVENTION

It is an object of the invention to address any or all of the issues raised by the prior art. It is further an object of the invention to provide matboards and backing boards that include an outer layer of a protective and vapor barrier film such as PET, PBT, co-PET, co-PBT and mixtures thereof, or as described herein; and methods for making and using such matboards and backing boards.

The invention thus provides a matboard and/or backing board comprised of an outer layer that is a protective layer and a vapor barrier; e.g., preferably PET, PBT, co-PET, co-PBT or mixtures thereof; and methods for making and using the same.

The invention also provides in a first advantageous embodiment a matboard comprising: a first layer of mat paper (of any various color), advantageously buffered to the basic side of neutral pH, e.g., greater than pH 7, such as pH of greater than 7.0 to about 9.0 or about 7.5 to about 8.0; a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; and a fifth layer, which is an outer layer, of a vapor barrier and protective material, such as PET, PBT, co-PET, co-PBT and mixtures thereof. Advantageously, the first, second, third, fourth and fifth layers are in direct contact (first to second, second to first and third, third to second and fourth, fourth to third and fifth and fifth to fourth).

The invention also provides in a second advantageous embodiment a backing board comprising: a first layer, which is an outer layer, of a vapor barrier and protective material, such as PET, PBT, co-PET, co-PBT and mixtures thereof; a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; and a fifth layer, which is an outer layer, of a vapor barrier and protective material, such as PET, PBT, co-PET, co-PBT and mixtures thereof. Advantageously, the first, second, third, fourth and fifth layers are in direct contact (first to second, second to first and third, third to second and fourth, fourth to third and fifth and fifth to fourth).

The inventive matboard and/or backing board can be any suitable size or shape, e.g., round, square, rectangle, etc. The sizes and shapes for an inventive matboard and/or backing board can be matched to artwork or archival document and the like for which it is to be used as backing. The protective and vapor barrier layer (e.g., PET, PBT, co-PET, co-PBT and mixtures thereof) is advantageously non-reactive, and acid free, and more advantageously neutral, non-reactive and a protective barrier against the migration of trace amounts of acid, moisture and other contaminants that might potentially damage artwork, archival documents and the like.

More generally, the protective and vapor barrier layer is advantageously a thermoplastic such as a polyethylene terephthalate (polyester; or PET), or a polybutylene terephthalate (PBT), or a copolymer of polyethylene terephthalate (polyester; or PET), or copolymer of polybutylene terephthalate (PBT), or a polypropylene, or a polyethylene such as a polyethylene from a single site catalyst system, or a metal foil. In preferred embodiments, this layer is from PET, PBT, coPET, coPBT or mixtures thereof, most preferably, PET; and, this layer can be metallized, e.g., in gold, silver or another color.

The first, third and fifth layers of the aforementioned first and second advantageous embodiments are joined in any desired manner, preferably via lamination with the second and fourth adhesive layers (e.g., polyvinyl acetate or "PVA" layers) as described above together. However, the adhesive layers can also be extruded; and likewise, the outer protective and vapor barrier layer(s) can be extruded (which in certain instances can avoid the use of adhesive layer(s)).

Thus, in further embodiments, the invention relates to a matboard or a backing board comprising the first, third and fifth layers of the aforementioned first and second advantageous embodiments. Accordingly, the invention provides a matboard comprising: a first layer of mat paper (of any various color), advantageously buffered to the basic side of neutral pH, e.g., greater than pH 7, such as pH of greater than 7.0 to about 9.0 or about 7.5 to about 8.0; a second layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; and a third layer, which is an outer layer, of a vapor barrier and protective material, such as PET, PBT, co-PET, co-PBT and mixtures thereof. And, the invention provides a backing board comprising: a first layer, which is an outer layer, of a vapor barrier and protective material, such as PET, PBT, co-PET, co-PBT and mixtures thereof; a second layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; and a third layer, which is an outer layer, of a vapor barrier and protective material, such as PET, PBT, co-PET, co-PBT and mixtures thereof. Advantageously, the first, second, and third, layers are advesively joined, i.e., there is an adhesive layer between the first and second and the second and third layers, e.g., an adhesive advantageously buffered to the basic side of neutral pH, e.g., greater than pH 7, such as pH of greater than 7.0 to about 9.0 or about 7.5 to about 8.0, for instance a layer of polyvinyl acetate or other suitable adhesive advantageously buffered to the basic side of neutral pH, e.g., greater than pH 7, such as pH of greater than 7.0 to about 9.0 or about 7.5 to about 8.0. The adhesive layers can be applied on or extruded onto the other layers. And, the outer protective and vapor barrier layers can also be extruded (which in certain instances can avoid the use of an adhesive layer). Accordingly in this three layer backing board embodiment, the first, second, and third layers can be in direct contact (first to second, second to first and third, third to second).

Additionally, in a further embodiment, the invention can include a matboard comprising: a first layer of mat paper (of any various color), advantageously buffered to the basic side of neutral pH, e.g., greater than pH 7, such as pH of greater than 7.0 to about 9.0 or about 7.5 to about 8.0; a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0; a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5; and a fourth layer, which is an outer layer, of a vapor barrier and protective material, such as PET, PBT, co-PET, co-PBT and mixtures thereof. In this embodiment, the first, second, third, and fourth layers can be in direct contact (first to second, second to first and third, third to second and fourth, fourth to third).

The invention therefore contemplates a method of manufacture comprising laminating the first, third and fifth layers of the first and second advantageous embodiments via the second and fourth adhesive layers; or extruding the first and fifth layers of the second advantageous embodiment directly onto the core third layer thereof; or extruding the first or the fifth layer of the second advantageous embodiment directly onto the core third layer thereof and adhesively laminating the other of the first or fifth layer thereof onto the core third layer; or adhesively laminating the first and third layers of the first advantageous embodiment and extruding the fifth layer onto the core third layer thereof..

And, the invention contemplates methods of using the matboard and/or backing board, e.g., providing a matboard and/or backing board of the invention and placing artwork or an archival document or picture (e.g., poster, photograph) upon it, and optionally framing the artwork, document or picture in a frame (with or without glass or plastic over the artwork, document or picture) with the artwork, document or picture against the matboard and/or backing board. These methods can be methods for framing artwork, a picture or a document, or methods for preserving artwork, a picture or a document.

The solid white core, cotton fiber board core, and chipboard core can be known types of core used in matboards and backing boards; and, can be of a thickness as in known matboards and backing boards. The mat facing paper can also be as in known matboards; and, can be of a thickness as in known matboards.

A typical machine for lamination useful in the practice of the invention is an Inta-roto Laminator or a Parry Linear or Waldron Coater. However, any suitable web-laminating machine may be used in the practice of the invention; and, from this disclosure and the knowledge in the art, one skilled in the art can obtain or design a suitable machine. The adhesive layer(s) can be approximately 0.0002 to about 0.001 inches thick or thicker; for instance about 0.0003 to about 0.0005 inches thick or thicker. The protective and vapor barrier layer can be approximately 0.0004 to about 0.001 inches thick or thicker.

The invention therefore contemplates a method of manufacture preferably comprising adhesively joining or laminating the first, third and fifth layers via the second and fourth layers of the first and second advantageous embodiments (or adhesively joining the first and third layers via the second layer of the first advantageous embodiment and extruding the fifth outer protective and vapor barrier layer directly to the third layer and thereby avoiding the fourth adhesive layer thereof).

These and other embodiments are disclosed or are obvious from and encompassed by, the following Detailed Description.

BRIEF DESCRIPTION OF THE FIGURES

The following Detailed Description, given by way of example, but not intended to limit the invention to specific embodiments described, may be understood in conjunction with the accompanying Figures, incorporated herein by reference, in which.

DETAILED DESCRIPTION

As discussed herein, the invention comprehends matboard or backing board comprising as an outer layer, a material that is a vapor barrier and protective; e.g., PET, PBT, co-PET, co-PBT, and mixtures thereof.

Figure 1:
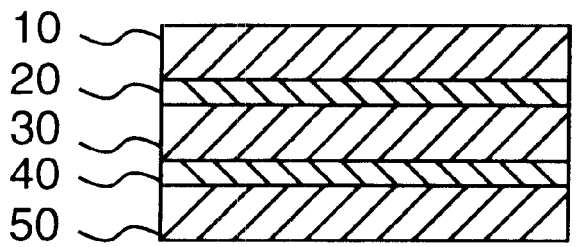
FIG. 1 shows a cross-section (not to scale) of a first embodiment of the invention.

Accordingly, FIG. 1 shows the first advantageous embodiment mentioned above. This first advantageous embodiment is a matboard. Layer 10 is on top of layer 20. Layer 20 is on top of layer 30. Layer 30 is on top of layer 40. And, layer 40 is on top of layer 50. Layer 10 is a first layer of mat paper (of any various color), advantageously buffered to the basic side of neutral pH, e.g., greater than pH 7, such as pH of greater than 7.0 to about 9.0 or about 7.5 to about 8.0. Layer 20 is a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0. Layer 30 is a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5. Layer 40 is a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0. And, layer 50 is a fifth layer, which is an outer layer, of a vapor barrier and protective material, such as PET, PBT, co-PET, co-PBT and mixtures thereof. Advantageously, as illustrated, the first, second, third, fourth and fifth layers are in direct contact (first to second, second to first and third, third to second and fourth, fourth to third and fifth and fifth to fourth).

Figure 2:
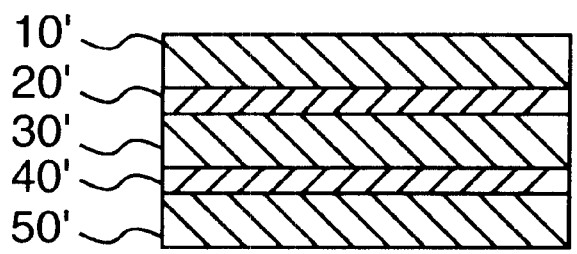
FIG. 2 shows a cross-section (not to scale) of a second embodiment of the invention.

FIG. 2 illustrates the aforementioned second advantageous embodiment; a backing board. In FIG. 2, layer 10' is on top of layer 20'. Layer 20' is on top of layer 30'. Layer 30' is on top of layer 40'. And, layer 40' is on top of layer 50'. Layer 10' is a first layer, which is an outer layer, of a vapor barrier and protective material, such as PET, PBT, co-PET, co-PBT and mixtures thereof. Layer 20' is a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0. Layer 30' is a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5. Layer 40' is a fourth layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0. And, layer 50' is a fifth layer, which is an outer layer, of a vapor barrier and protective material, such as PET, PBT, co-PET, co-PBT and mixtures thereof. Advantageously, as illustrated, the first, second, third, fourth and fifth layers are in direct contact (first to second, second to first and third, third to second and fourth, fourth to third and fifth and fifth to fourth).

Figure 3:
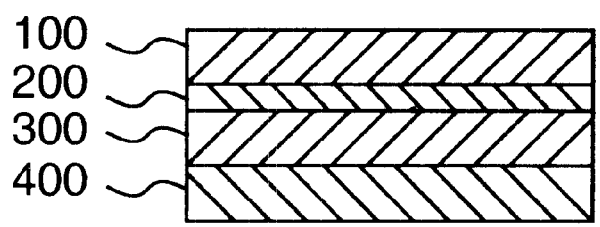
FIG. 3 shows a cross-section (not to scale) of a second embodiment of the invention.

FIG. 3 shows a variation on the first advantageous embodiment mentioned above. This variation is a matboard. Layer 100 is on top of layer 200. Layer 200 is on top of layer 300. And, layer 300 is on top of layer 400. Layer 100 is a first layer of mat paper (of any various color), advantageously buffered to the basic side of neutral pH, e.g., greater than pH 7, such as pH of greater than 7.0 to about 9.0 or about 7.5 to about 8.0. Layer 200 is a second layer of adhesive, advantageously buffered to the basic side of neutral pH, e.g., greater than pH 7, such as pH of greater than 7.0 to about 9.0 or about 7.5 to about 8.0, for instance a layer of polyvinyl acetate advantageously buffered to the basic side of neutral pH, e.g., greater than pH 7, such as pH of greater than 7.0 to about 9.0 or about 7.5 to about 8.0. Layer 300 is a third layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5. And, layer 400 is a fourth layer, which is an outer layer, of a vapor barrier and protective material, such as PET, PBT, co-PET, co-PBT and mixtures thereof. Advantageously, as illustrated, the first, second, third, and fourth layers are in direct contact (first to second, second to first and third, third to second and fourth, fourth to third). This can be achieved by extruding layer 400 onto layer 300 and adhesively laminating layer 300 to layer 100 via layer 200.

Figure 4:
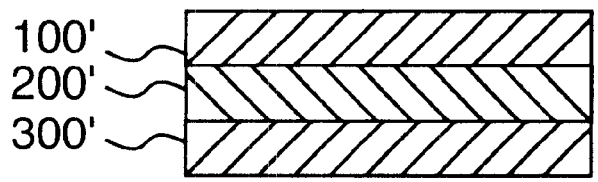
FIG. 4 shows a cross-section (not to scale) of a second embodiment of the invention.

FIG. 4 illustrates a variation on the aforementioned second advantageous embodiment; a backing board. In FIG. 4, layer 100' is on top of layer 200'. And, Layer 200' is on top of layer 300'. Layer 100' is a first layer, which is an outer layer, of a vapor barrier and protective material, such as PET, PBT, co-PET, co-PBT and mixtures thereof. Layer 200' is a second layer of board core, e.g., chipboard core or solid white core or cotton fiber board, advantageously alum and/or lignin free, preferably alum and lignin free, and also advantageously alkaline, such as pH of greater than 7.0, e.g., pH of about 7.1 to about 10.0 such as a pH of about 7.2 to about 9.5. And, layer 300' is a third layer, which is an outer layer, of a vapor barrier and protective material, such as PET, PBT, co-PET, co-PBT and mixtures thereof. Advantageously, as illustrated, the first, second, and third layers are in direct contact (first to second, second to first and third, third to second). This can be achieved by extruding the layers 100' and 300' onto layer 200'.

The adhesive layer can be any suitable adhesive to laminate layers to each other, such as solvent or liquid adhesive, e.g., water-based or urethane adhesive, or solid adhesive. The adhesive should not detract from the desired characteristics of the board. Adhesives for adhesive layers can be solventless adhesives such as the TYCEL® laminating adhesives available from the Lord Corporation, e.g., the TYCEL® 7975 Adhesive and TYCEL® 7276 curing agent. Alternatively, the adhesive layer can be an adhesive material such as a copolymer of ethylene and an ethylenically unsaturated comonomer, for instance ethylene vinyl acetate (EVA). PVA with a pH as herein mentioned is preferred; other adhesives should likewise have similar pH.

Accordingly, in the manufacture of embodiments of the invention the layer preferably comprised of PET, and the mat facing paper layer, and the core layer are fed from webs through a coater-laminator, typically an Ina-Roto Laminator or Parry Liner or Waldron Coater or the like. A layer of adhesive is coated onto the mat facing paper layer and/or the PET layer and/or the core layer and then the layers are joined together at the nip rollers and pass through a drying section where, through a combination of heat and pressure the layers are adhered together such that the structure 10/20/30/40/50 or 10'/20'/30'/40'/50' is formed. Alternatively, by an analogous method, the structure 100/200/300 is formed (no use of layer that is preferably PET), and thereafter the layer that is preferably PET is extruded onto the 100/200/300 structure; or, a first structure of 300/400 is formed by extruding the layer that is preferably PET onto the core 300, and the core 300 and the mat paper layer 100 are then passed through the machine to have adhesive applied to result in the 100/200/300/400 strtucture. And, the 100'/200'/300' structure can be prepared by extruding the 100' and 300' either simultaneously or serially onto the 200' core layer.

The matboards or backing boards of the invention can be any suitable thickness. Thickness can be varied as desired, depending upon the end use for the board; but, the board should, in overall thickness, be sufficient to support artwork, pictures or documents. Typical thicknesses may be up to about 0.050 to about 0.180 inches, e.g., up to 1.3 to 4.5 mm.

Further, while the invention has been illustrated with respect to three, four and five layers, additional layers may be present. However, it is desirable that the board have at least one outer layer that is a protective and vapor barrier; e.g., of a material therefor as herein described. Thus, between layers 10 and 20 or between layers 20 and 30 or between layers 30 and 40 or between layers 40 and 50 of FIG. 1, or between layers 10' and 20' or between layers 20' and 30' or between layers 30' and 40' or between layers 40' and 50' of FIG. 2 or between 100 and 200 or between layers 200 and 300 or between layers 300 and 400 of FIG. 3, or between layers 100' and 200' or between layers 200' and 300' of FIG. 4 can be an additional layer or layers from any suitable material such as polyethylene, LDPE, LLDPE, ULDPE, VLDPE, HDPE, polypropylene, oriented polypropylene, single site catalyst polyethylene, an elastomer or other commercially available materials such as ethylene-propylene and ethylene-butene copolymer elastomers, or blends thereof (see U.S. Ser. No. 09/156,096, filed Sep. 17, 1998, incorporated herein by reference). However, such additional layers should have the pH characteristics specified for layers 10, 20, 30, 40, 50, 10', 20', 30', 40', 50', 100, 200, 300, 400, 100', 200', and 300', and, given the excellent performance of the exemplified embodiments of the invention and economic and ecological considerations, additional layers are not considered necessary. Also, in the embodiments of FIGS. 1 and 3, it is preferred that the outer layer 10 and 100 be a mat paper layer; and, in the embodiments of FIGS. 2 and 4, it is preferred that layers 10' and 50' and 100' and 300', as well as layers 50 and 400 in FIGS. 1 and 3, be of a protective and vapor barrier material.

In use, the artwork, picture or document is placed against the inventive board; and, the combination thereof can then be framed.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A board comprising a layer of matboard and/or backing board buffered to a pH greater than 7.0 and an outer layer that is a protective layer and or vapor barrier.

2. The board of claim 1 wherein the outer layer is comprised of PET, PBT, co-PET, co-PBT or mixtures thereof.

3. A matboard comprising: a first layer of mat paper buffered to a pH of greater than 7.0; a second layer of adhesive buffered to a pH of greater than 7.0; a third layer of board core, alum and lignin free, and alkaline, having a pH of greater than 7.0; a fourth layer of adhesive buffered to a pH of greater than 7.0; and a fifth layer, which is an outer layer, of a vapor barrier and protective material.

4. The matboard of claim 3 wherein the outer layer is comprised of PET, PBT, co-PET, co-PBT or mixtures thereof.

5. The matboard of claim 3 wherein the first layer has pH of greater than 7.0 to about 9.0.

6. The matboard of claim 3 wherein the second and fourth layer comprise polyvinyl acetate buffered to pH of greater than 7.0 to about 9.0.

7. The matboard of claim 3 wherein the third layer is comprised of chipboard core or solid white core or cotton fiber board having a pH of about 7.1 to about 10.0.

8. The matboard of claim 3 wherein the first, second, third, fourth and fifth layers are in direct contact: first to second, second to first and third, third to second and fourth, fourth to third and fifth and fifth to fourth.

9. The matboard of claim 3, wherein the first layer has a pH of about 7.5 to about 8.0.

10. The matboard of claim 3, wherein the second and fourth layers comprise polyvinyl acetate buffered to a pH of about 7.5 to about 8.0.

11. The matboard of claim 3, wherein the third layer is comprised of chipboard core or solid white core or cotton fiber board having a pH of about 7.2 to about 9.5.

12. A backing board comprising: a first layer which is an outer layer, of a vapor barrier and protective material; a second layer of adhesive buffered to a pH of greater than 7.0; a third layer of board core, alum and lignin free, and alkaline, having a pH of greater than 7.0; a fourth layer of adhesive buffered to a pH of greater than 7.0; and a fifth layer, which is an outer layer, of a vapor barrier and protective material.

13. The backing board of claim 12 wherein the first and fifth outer layers, independent of the other, are each comprised of PET, PBT, co-PET, co-PBT or mixtures thereof.

14. The backing board of claim 12 wherein the second and fourth layer comprise polyvinyl acetate buffered to pH of greater than 7.0 to about 9.0.

15. The backing board of claim 12 wherein the third layer is comprised of chipboard core or solid white core or cotton fiber board having a pH of about 7.1 to about 10.0.

16. The backing board of claim 12 wherein the first, second, third, fourth and fifth layers are in direct contact: first to second, second to first and third, third to second and fourth, fourth to third and fifth and fifth to fourth.

17. The backing board of claim 12, wherein the second and fourth layers comprise polyvinyl acetate buffered to a pH of about 7.5 to about 8.0.

18. The backing board of claim 12, wherein the third layer is comprised of chipboard core or solid white core or cotton fiber board having a pH of about 7.2 to about 9.5.

19. A backing board comprising: a first layer which is an outer layer, of a vapor barrier and protective material; a second layer of board core, alum and lignin free, and alkaline, having a pH of greater than 7.0; and a third layer, which is an outer layer, of a vapor barrier and protective material.

20. The backing board of claim 19 wherein the first and third outer layers, independent of the other, are each comprised of PET, PBT, co-PET, co-PBT or mixtures thereof.

21. The backing board of claim 19 wherein the second layer is comprised of chipboard core or solid white core or cotton fiber board having a pH of about 7.1 to about 10.0.

22. The backing board of claim 19, wherein the second layer is comprised of chipboard core or solid white core or cotton fiber board having a pH of about 7.2 to about 9.5.

23. A matboard comprising: a first layer of mat paper buffered to a pH of greater than 7.0; a second layer of adhesive buffered to a pH of greater than 7.0; a third layer of board core, alum and lignin free, and alkaline, having a pH of greater than 7.0; a fourth layer, which is an outer layer, of a vapor barrier and protective material.

24. The matboard of claim 23 wherein the outer layer is comprised of PET, PBT, co-PET, co-PBT or mixtures thereof.

25. The matboard of claim 23 wherein the first layer has pH of greater than 7.0 to about 9.0.

26. The matboard of claim 23 wherein the second layer comprises polyvinyl acetate buffered to pH of greater than 7.0 to about 9.0.

27. The matboard of claim 23 wherein the third layer is comprised of chipboard core or solid white core or cotton fiber board having a pH of about 7.1 to about 10.0.

28. The matboard of claim 23, wherein the first layer has a pH of about 7.5 to about 8.0.

29. The matboard of claim 23, wherein the second layer comprises polyvinyl acetate buffered to a pH of about 7.5 to about 8.0.

30. The matboard of claim 23, wherein the third layer is comprised of chipboard core or solid white core or cotton fiber board having a pH of about 7.2 to about 9.5.

31. A method for fabricating a matboard and/or a backing board as claimed in any one of claim 12, 19, or 23, comprising joining the first, second, third, fourth and fifth layers of the matboard of claim 3 or of the backing board of claim 12, or the first, second and third layers of the backing board of claim 19, or the first, second, third and fourth layers of the matboard of claim 23, or joining as an outer layer a protective and vapor barrier layer to a matboard or backing board.

32. The method of claim 31 wherein the outer layer is comprised of PET, PBT, co-PET, co-PBT or mixtures thereof.

33. A method of framing or preserving artwork, a picture or a document comprising placing the artwork, picture or document in contact with the matboard of claim 3 or the backing board of claim 12, or the backing board of claim 19, or the matboard of claim 23, and framing the combination of the artwork, picture or document and the matboard or backing board.

34. The method of claim 33 wherein the outer layer of the matboard or backing board is comprised of PET, PBT, co-PET, co-PBT or mixtures thereof.

* * * * *